UNITED STATES PATENT OFFICE.

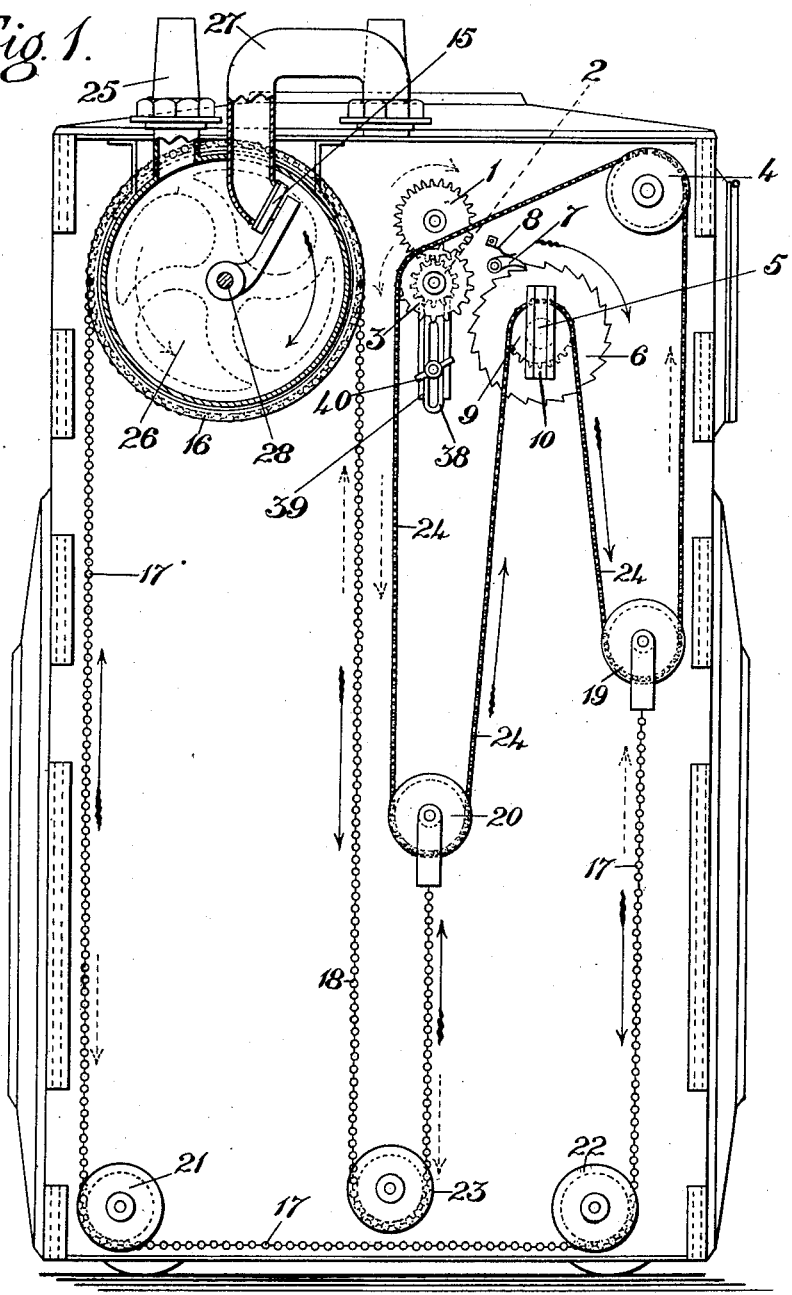

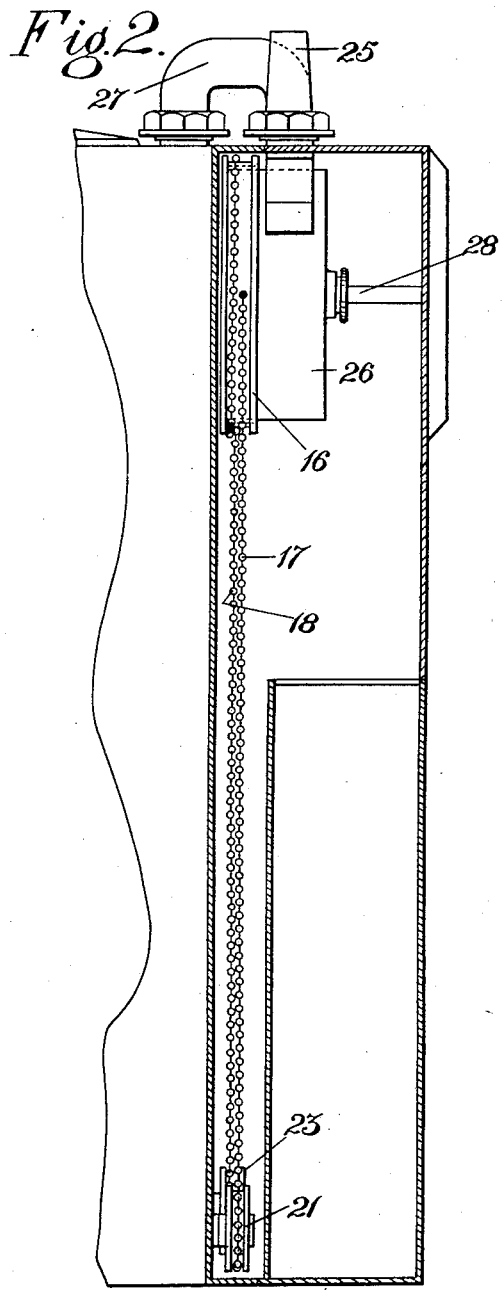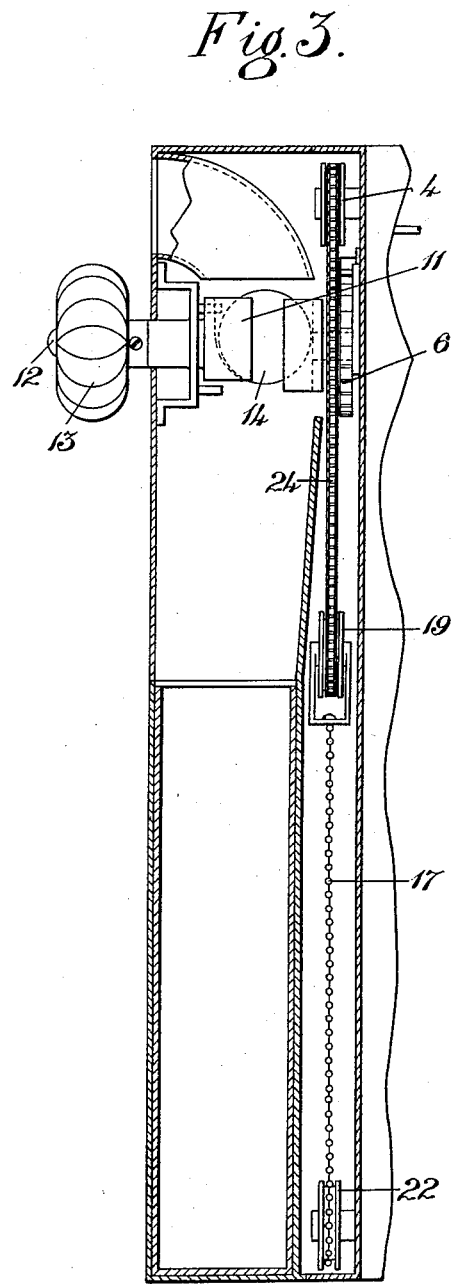

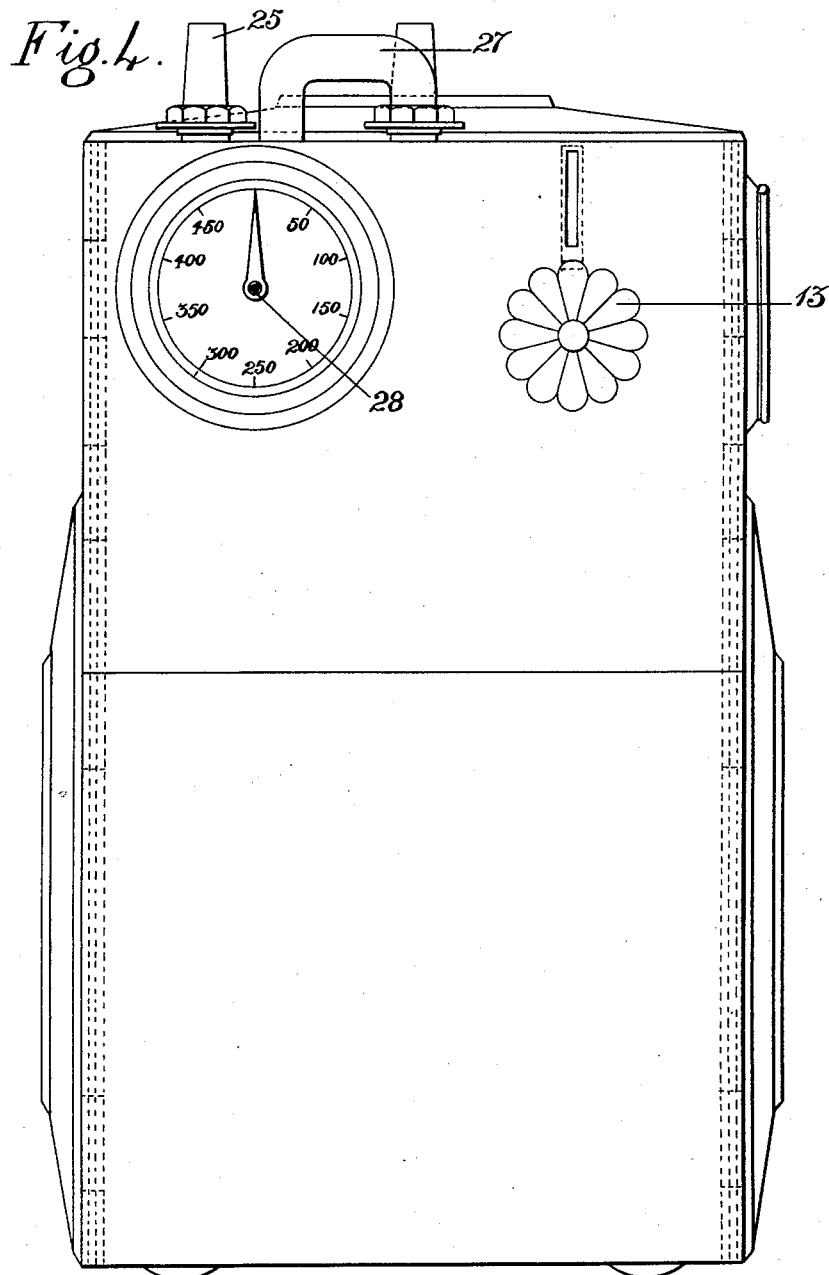

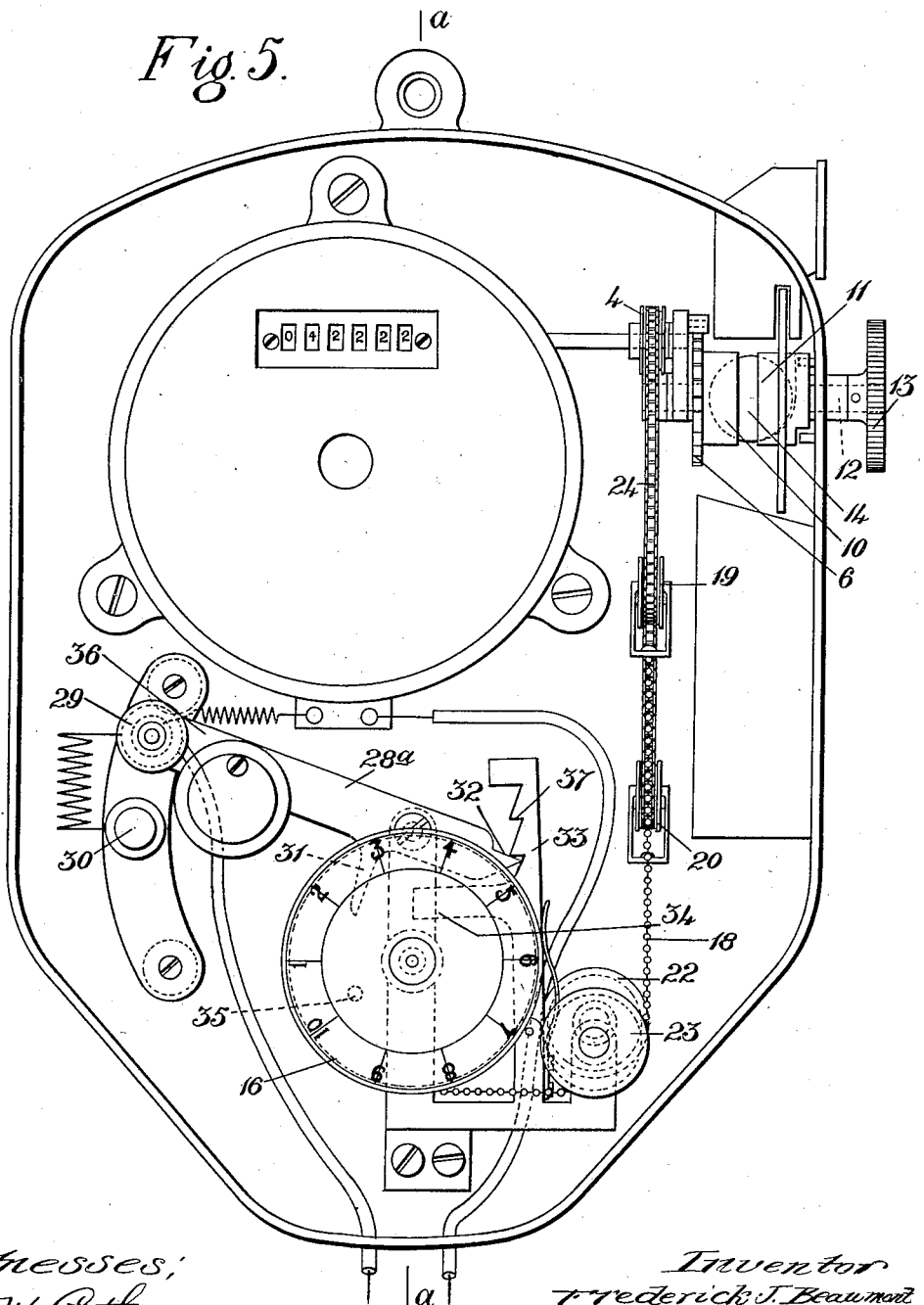

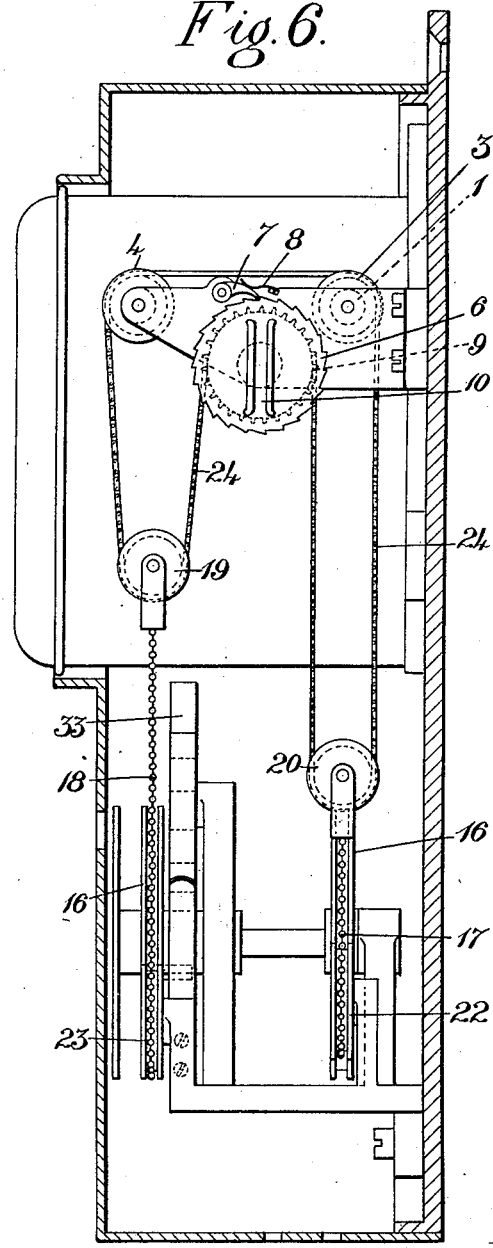

FREDERICK JOHN BEAUMONT, OF STROUD GREEN, ENGLAND, ASSIGNOR OF ONE-THIRD TO JAMES WILLIAM ROOK, OF LONDON, ENGLAND, AND ONE-THIRD TO HEINRICH NEUBURGER, OF FURTH, BAVARIA, GERMANY.

PREPAYMENT-METER.

1,008,108. Specification of Letters Patent. Patented Nov. 7, 1911.

Application filed November 6, 1909. Serial No. 526,614.

*To all whom it may concern:*

Be it known that I, FREDERICK JOHN BEAUMONT, a subject of the King of Great Britain, residing at 21 Albany road, Stroud Green, Middlesex, England, have invented certain new and useful Improvements in Prepayment-Meters, of which the following is a specification.

The object of this invention is to construct improved mechanism operable after the insertion of a coin or coins and actuation of a handle or device to set the apparatus for delivery of electric current, gas, water, or other fluid or liquid and by the working of the apparatus due to the flow or action of the fluid or liquid, such mechanism is operated to return the appliance to shut off or stop the supply of liquid or fluid after any predetermined quantity has passed through.

The invention will be clearly understood from the following description, aided by the annexed drawings in which:—

Figure 1. is a front side elevation of a gas meter (with the door removed) and showing the invention. Fig. 2. is a sectional elevation of part of a gas meter at right angles to Fig. 1, and from the left hand side thereof and showing the invention. Fig. 3 is a section elevation of part of a gas meter at right angles to Fig. 1, and from the right hand side thereof and showing the invention. Fig. 4. is a side elevation of a gas meter. Fig. 5. is a front elevation of an electric meter with the front removed and showing the invention. Fig. 6. is a side elevation of Fig. 5 on the line *a a*.

For the purpose of my invention I connect to some working part of the apparatus, say a screw, operated from the index or recording mechanism, a toothed wheel 1, meshing with a toothed wheel 2 which carries on its axle a sprocket wheel 3. Near thereto is affixed an idle sprocket wheel 4 and preferably below and between the sprocket wheels 3 and 4 is positioned an axle 5 carrying a ratchet wheel 6 controlled by a pawl 7 and spring 8 and a sprocket wheel 9 movable with the axle 5 in one direction only. This axle 5 or a wheel thereon is provided with a slotted extension 10 which corresponds to a similar slotted device 11 on the axle 12 of the handle 13 and the two slotted extensions 10 and 11 form the coin pocket or carrying device so that on the insertion of a coin 14, see Fig. 3, the axle 5 can be moved.

To the closing or shut off device 15 of the apparatus I connect a pulley or wheel 16, this carrying a chain or cord, or it may be two chains or cords 17, 18, having at its or their ends pulleys 19, 20, the chains passing over idle pulleys 21, 22 and 23. I employ an endless chain 24 which is passed over the sprocket wheel 3, idle sprocket wheel 4, sprocket wheel 9 on the ratchet wheel axle 5 and around the pulleys 19 and 20 connected to the cords 17 and 18 of the disk or wheel 16 the chain 24 being kept taut.

In the drawing, Fig. 1, the gas enters by a pipe 25 a box 26 on which is positioned a pipe 27 leading to the bellows of the meter and the shutting off device 15 consists of a lever fitted on an axle 28 riding on the box 26, which lever has action upon the end of the pipe 27 to shut off the gas.

When the appliances are employed with an electric meter as at Figs. 5 and 6, I pivot a weighted contact lever 28ª to the frame of the apparatus, one end of which lever rides against live contacts 29 and 30 representing full current and half or reduced current. This lever 28ª is provided with an arm 31 projecting at an angle and is controlled by the other end 32 riding against a toothed spring controlled bar 33 which holds it in three positions as hereafter explained. Projecting from the toothed bar is a rod 34 against which a stop 35 on the pulley or disk 16 has action as it is revolved to release the lever 28ª but this forms no part of the invention.

I prefer for simplicity of construction that the axle carrying the ratchet and sprocket wheels has one end slotted and the handle by which the mechanism is operated carries a slotted sleeve which encircles the axle and when in one position the slot in the sleeve shall coincide with the slot in the axle and surrounding one half of the axle and sleeve is a shield so that when a coin is dropped into the slots it shall ride around the shield and be prevented falling out of the slot should the handle be released, until the full movement of the handle is effected.

After a coin has been inserted into the slots of the extensions 10 and 11, the handle 13 is turned (the coin forming the connection between the handle 13 and the ratchet wheel axle 5) and in so doing the sprocket wheel 9 on the ratchet wheel axle 5 will actuate the chain 24 on the side and lift the pulley 20 and cord 18 and rotate the pulley or disk 16 and move the mechanism to create a supply of fluid or liquid to the apparatus.

In the case of an electric meter the stop 35 on pulley or disk 16 will act against the arm 31 of the pivoted lever 28$^a$, and lift its contact end 36 to the top contact 29 for full supply of current, the other end of the lever moving down the teeth 37 of the spring controlled rod 33 so that when the handle 13 has completed its operation and the coin fallen away the bottom tooth of the spring controlled rod 33 will have engaged the end 32 of the lever 28$^a$ and will hold it at the placed position.

The mechanism is now in operation for supply of the fluid or liquid and the action of the apparatus through the index or recording mechanism, revolves the toothed wheel 1, the toothed wheel 2 and the sprocket 3 on the same axle as the wheel 2, and drawing the chain 24 off the idle roller 4 and taking up that portion of the chain between the coin operated sprocket 6 and the idle roller 4 will act upon the pulley 19 and draw up the chain 17 and revolve the pulley or disk 16, the pulley disk 16 by its movement winding on the cord 18 and drawing down the pulley 20. During this movement, in the case of a gas meter, the lever arm 15 has been approaching the end of the pipe 27 to close it and stop the supply of gas when the movement is finished or in the case of an electric meter the stop 35 on the pulley disk 16 is acting upon the rod 34 of the toothed bar 33 and gradually pushes it away from the end of the pivoted contact rod 28$^a$ and when the greater portion of the current has been consumed the toothed bar 33 will be so positioned that the lever 28$^a$ is released from the bottom tooth and its weighted end 36 will fall and cause the other end to engage and be arrested by the next tooth. At this position the contact end 36 of the lever 28 has engaged the next contact 30 which is in connection with a resistance or other appliance which causes a reduced supply to flow from the meter and cause reduction in the light (known as dimming) and just as the predetermined quantity of current has been consumed the bar will be moved farther to again release the lever 28$^a$ for its weighted end to fall to "off" position, and its other end to engage the next tooth when the supply is cut off and the appliances are in position for a repeat operation on the insertion of a coin.

I do not restrict myself to any particular mechanism to operate the appliances for establishing a supply of liquid or fluid from the pulley disk as they may be varied according to the design of apparatus to which my invention is applied, and neither do I restrict myself to any class of mechanism to operate the toothed wheel to move the appliances to shut off the supply as such appliances may be operated by index, counting, or recording mechanism or otherwise, or by clockwork when a fluid or liquid is delivered by the time system.

The sprocket 9 on the axle of the ratchet wheel 6 is made of a size to suit the quantity of fluid or liquid to be delivered, or I may have different sized sprocket wheels 2 or toothed wheels 3 whose axle is affixed to an arm 38 positioned in the slotted race 39 and held by a thumb screw 40, and then act as what is known as a "price changer."

What I do claim as my invention and desire to secure by Letters Patent is:

1. In a prepayment meter, the combination, with a current controller comprising a shaft, and a wheel and a rotary cut-off device secured thereto; of an endless chain having a pair of pendent portions; flexible connections between said portions and said wheel for rotating said shaft and cut-off device; and means for driving said chain in one direction to rotate said cut-off device into open position.

2. In a prepayment meter, the combination, with means for controlling a current of fluid; of rotatable operating means connected with said controlling means; means connected with said operating means for rotating the same in one direction, to open said controlling means; and additional means connected with said operating means and adapted for operation from the registering mechanism of the meter for rotating said operating means in the opposite direction, to close said controlling means.

3. In a prepayment meter, the combination, with means for controlling a current of fluid; of an endless flexible element operatively connected with said controlling means; means for driving said element in one direction to open said operating means; and additional means adapted for operation from the registering mechanism of the meter for driving said element in the opposite direction, to close said controlling means.

4. In a prepayment meter, the combination, with means for controlling a current of fluid; of an endless chain; flexible connections between said chain and said controlling means; a sprocket engaged with said chain for driving the latter in one direction, to open said controlling means; and an additional sprocket engaged with said chain and adapted to be driven from the registering mechanism of the meter for driving said chain in the opposite direction, to close said controlling means.

5. In a prepayment meter, the combination, with a current controller comprising a shaft, and a wheel and a rotary cut-off device secured thereto; of an endless flexible element; flexible means connecting said element with said wheel, for rotating the latter from the former; means for driving said element in one direction to rotate said cut-off device into closed position; and additional means for driving said element in the opposite direction, to rotate said cut-off device into closed position.

6. In a prepayment meter, the combination, with a current controller comprising a shaft, and a wheel and a rotary cut-off device secured thereto; of an endless flexible element; flexible means connecting said element with said wheel, for rotating the latter from the former; means for driving said element in one direction to rotate said cut-off device into closed position; and additional means for driving said element in the opposite direction, to rotate said cut-off device into closed position, said additional driving means being adapted to be operatively connected with the registering mechanism of the meter.

7. In a prepayment meter, the combination, with means for controlling a current of fluid; of an endless flexible element connected with said controlling means for operating the same; a pair of independently operable driving members engaged with said element for moving the latter in opposite directions; and a pawl-and-ratchet device associated with one of said members.

8. In a prepayment meter, the combination with means for controlling a current of fluid; of an endless flexible element connected with said controlling means for operating the same; a pair of independently operable driving members engaged with said element for moving the latter in opposite directions, one of said members being adapted to be operatively connected with the registering mechanism of the meter; and a pawl-and-ratchet device associated with the other member.

9. In a prepayment meter, the combination, with rotatable means for controlling a current of fluid; of a flexible element provided with a pair of pendent portions; connections between said portions and said controlling means; means for raising one of said portions, to rotate said controlling means in one direction; and additional means for raising the other portion, to rotate said controlling means in the opposite direction.

10. In a prepayment meter, the combination, with rotatable means for controlling a current of fluid; of a flexible element provided with a pair of pendent portions; connections between said portions and said controlling means; means for raising one of said portions, to rotate said controlling means in one direction; a pawl-and-ratchet device associated with said raising means; and additional means for raising the other portion, to rotate said controlling means in the opposite direction, said additional raising means being adapted to be operatively connected with the registering mechanism of the meter.

11. In a prepayment meter, the combination, with rotatable means for controlling a current of fluid; of a flexible element provided with a pair of pendent portions; connections between said portions and said controlling means; means for raising one of said portions, to rotate said controlling means in one direction; and additional means for raising the other portion, to rotate said controlling means in the opposite direction, one of said raising means being adapted to be operatively connected with the registering mechanism of the meter.

12. In a prepayment meter, the combination, with rotatable means for controlling a current of fluid; of a flexible element provided with a pair of pendent portions; connections between said portions and said controlling means; means for raising one of said portions and simultaneously lowering the other portion, to rotate said controlling means in one direction; and additional means for raising said other portion and simultaneously lowering the first named portion, to rotate said controlling means in the opposite direction.

In testimony whereof I have hereunto set my hand in presence of two subscribing witnesses.

FREDERICK JOHN BEAUMONT.

Witnesses:
 WM. O. BROWN,
 F. C. SMITH.

Copies of this patent may be obtained for five cents each, by addressing the "Commissioner of Patents, Washington, D. C."